Oct. 18, 1932.　　　　　M. KING　　　　　1,883,797
CARRIAGE ADJUSTMENT FOR CAMERA FRAMES
Filed Dec. 7, 1931
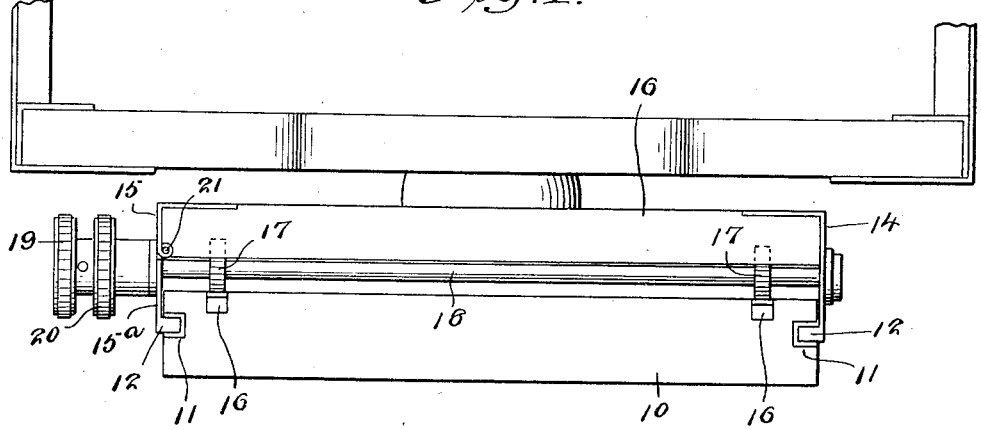
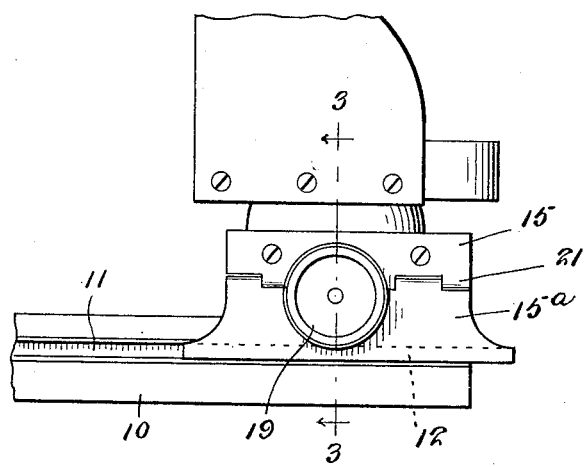
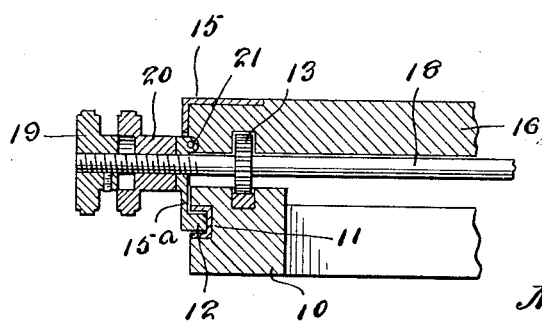
Melbert King
INVENTOR
BY Victor J. Evans & Co.
ATTORNEY Patented Oct. 18, 1932

1,883,797

UNITED STATES PATENT OFFICE

MELBERT KING, OF ALTOONA, PENNSYLVANIA

CARRIAGE ADJUSTMENT FOR CAMERA FRAMES

Application filed December 7, 1931. Serial No. 579,598.

The object of the invention is to provide a construction for use in connection with the carriages of camera frames in advancing them along the base, so that the adjustment may be readily effected and the carriage easily and effectively secured in its adjusted position; and to provide a construction of the kind indicated which is of simple form and susceptible of cheap manufacture.

With this object in view, the invention consists in a construction and combination of parts of which a preferred embodiment is illustrated in the accompanying drawing but to which embodiment the invention is not to be restricted. Continued use in practice may suggest certain changes or alterations which the right is claimed to make, insofar as such changes or alterations may be comprehended in spirit by the annexed claims.

In the drawing:

Figure 1 is an end elevational view of a camera base and carriage, showing the invention applied.

Figure 2 is a side elevational view of the structure of Figure 1.

Figure 3 is a sectional view on the plane indicated by the line 3—3 of Figure 2.

The base 10 is of the customary form provided with the lateral guide grooves 11 in which the ribs 12 of the guides 14 and 15 are engaged, the guides being secured to the carriage 16, so that the latter may be moved back and forward on the base, the ribs 12 sliding in the guide grooves.

The guide 14 is constructed according to conventional practice, being of rigid formation, but the guide 15 is modified over the general practice, so that it may be readily moved into clamping engagement with the base, so that any adjustment of the carriage may be effectively maintained.

The base 10 is provided with the customary racks 16 disposed adjacent opposite sides and in mesh with these racks are the pinions 17 carried by the shaft 18, the latter being journaled or rotatably mounted in the guides 14 and 15.

On the outside of the guide 15, the shaft 18 is provided with a finger turning knob 19 between which and the guide 15 is mounted a clamp nut 20, the latter being threadingly mounted on the shaft 18, so that by rotary movement it may be moved axially, of the shaft, turning it in one direction moving it toward the actuating knob 19 while turning it in the other direction will bring it into clamping engagement with the guide 15, the latter being formed with a swinging leaf portion 15ª hingedly mounted on the body portion as indicated at 21, the hinge being above the plane of the shaft 18. Since the rib 12 is carried on the leaf portion 15ª, the leaf portion and rib, when the nut 20 is retracted, will slide freely along the base, when the shaft 18 is rotated by means of the knob 19. When the desired position of the carriage has been obtained, however, the adjustment may be effectively secured by bringing the clamp nut 20 down upon the leaf 15ª, causing the latter to be pressed against the side edge of the carriage to clamp the latter on the base in the adjusted position.

The invention having been described, what is claimed as new and useful is:

1. A device for the purpose indicated comprising a base, a carriage slidably mounted on the base and provided with guides entering guide grooves on the latter, operative connections between the carriage and the base for effecting movement of the former along the latter in small increments, and a clamping member carried by said means, one of the guides having a movable element engageable by said clamping member to lock the carriage in any adjusted position.

2. A device for the purpose indicated comprising a base, a carriage slidably mounted on the base and having guides provided with ribs entering guide grooves on the base, one of the guides having a swinging leaf on which its rib is mounted, a shaft carried by the carriage and operatively connected with the base for advancing the carriage along the latter, said shaft being provided with an actuating knob, and a clamp nut threadingly mounted on said shaft and movable toward and away from the swinging leaf of said guide to be released from or engaged with said leaf to permit free movement of the carriage or to clamp the latter in any adjusted position.

In testimony whereof I affix my signature.

MELBERT KING.